US010963808B1

(12) United States Patent
Kumari

(10) Patent No.: US 10,963,808 B1
(45) Date of Patent: Mar. 30, 2021

(54) PREDICTING EVENT OUTCOMES USING CLICKSTREAM DATA

(71) Applicant: Neha Kumari, Newark, CA (US)

(72) Inventor: Neha Kumari, Newark, CA (US)

(73) Assignee: Intuit Inc., Mountain View, CA (US)

( * ) Notice: Subject to any disclaimer, the term of this patent is extended or adjusted under 35 U.S.C. 154(b) by 624 days.

(21) Appl. No.: 15/946,417

(22) Filed: Apr. 5, 2018

Related U.S. Application Data

(63) Continuation-in-part of application No. 15/937,661, filed on Mar. 27, 2018, now abandoned.

(51) Int. Cl.
*G06N 7/00* (2006.01)
*G06F 9/54* (2006.01)

(52) U.S. Cl.
CPC ............ *G06N 7/005* (2013.01); *G06F 9/542* (2013.01)

(58) Field of Classification Search
CPC combination set(s) only.
See application file for complete search history.

(56) References Cited

U.S. PATENT DOCUMENTS

| | | | |
|---|---|---|---|
| 2007/0118498 A1* | 5/2007 | Song | G06F 16/34 |
| 2010/0082400 A1* | 4/2010 | Bagherjeiran | G06Q 30/02 705/14.47 |
| 2013/0060482 A1* | 3/2013 | Sikora | G01N 27/4145 702/20 |
| 2014/0365403 A1* | 12/2014 | Demuth | G06Q 10/04 706/11 |
| 2015/0371141 A1* | 12/2015 | Yeon | G06N 20/00 706/12 |
| 2019/0102681 A1* | 4/2019 | Roberts | G06N 20/20 |
| 2019/0378049 A1* | 12/2019 | Widmann | G06N 3/0472 |

OTHER PUBLICATIONS

Rokach, L. et al., "Data Mining with Decision Trees: Theory and Applications", Series in Machine Perception and Artificial Intelligence, 2nd Edition, vol. 81, World Scientific Publishing Co. Pte. Ltd., ISBN 978-9814590075, ISBN 978-9814590082, Oct. 2014 (328 pages).
Quinlan, J.R., "Induction of Decision Trees", Machine Learning, vol. 1, Issue 1, pp. 81-106, Kluwer Academic Publishers, Mar. 1986 (26 pages).
Breiman, L., "Bagging Predictors"; Machine Learning, vol. 24, Issue 2, pp. 123-140, Aug. 1996 (18 pages).

* cited by examiner

*Primary Examiner* — Tuan C Dao
(74) *Attorney, Agent, or Firm* — Ferguson Braswell Fraser Kubasta PC

(57) ABSTRACT

A method may include extracting, from historical clickstream data, historical user events, generating historical user features from the historical user events, generating, using the historical user features, a training data set including feature vectors each labeled with an outcome of a historical requested event, adding, to a decision tree: internal nodes corresponding to the historical user features, branches corresponding to the values of the historical user features, and leaf nodes each corresponding to an outcome of the historical requested event. The method may further include extracting, from new clickstream data, new user events, generating new user features from the new user events, detecting a request to cause a new requested event, and predicting an outcome of the new requested event by traversing a path including: a series of branches each corresponding to a value of one of the new user features, and a leaf node corresponding to the outcome.

20 Claims, 8 Drawing Sheets

PREDICTING EVENT OUTCOMES USING CLICKSTREAM DATA

CROSS-REFERENCE TO RELATED APPLICATION

This application is a continuation-in-part of U.S. Non-Provisional patent application Ser. No. 15/937,661, filed on Mar. 27, 2018, and entitled "PREDICTING EVENT OUTCOMES USING CLICKSTREAM DATA." U.S. Non-Provisional patent application Ser. No. 15/937,661 is incorporated herein by reference in its entirety.

BACKGROUND

It is often desirable to be able to predict the outcomes of events relating to a user's experience. During a session with a software application, users may request that specific events occur. For example, a user may attempt to connect to a target over a network while using a web-based application (e.g., in a financial management application, connecting to a target bank). However, for various reasons (e.g., various error conditions due to user actions, back-end events and/or network events), the specific event may fail to occur, which may degrade the user experience. Thus, it would be advantageous to provide a capability for predicting outcomes of a requested event to avoid degrading the user experience.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including extracting, from historical clickstream data, historical user events, generating historical user features from the historical user events, and generating, using the historical user features, a training data set including feature vectors each labeled with an outcome of a historical requested event. Each feature vector includes a value for each of the historical user features. The method further includes adding, to a decision tree, by calculating, using the training data set, feature relevance metrics for the historical user features: internal nodes corresponding to a subset of the historical user features, branches corresponding to the values of the subset of the historical user features, and leaf nodes each corresponding to an outcome of the historical requested event. The method further includes extracting, for a user and from new clickstream data, new user events, generating new user features from the new user events, detecting a request from the user to cause a new requested event, and making a prediction regarding an outcome of the new requested event by traversing, through the decision tree, a path including: a series of branches each corresponding to a value of one of the new user features, and a leaf node corresponding to the outcome.

In general, in one aspect, one or more embodiments relate to a system including a computer processor, and an event extractor executing on the computer processor configured to extract, from historical clickstream data, historical user events, and extract, for a user and from new clickstream data, new user events. The system further includes a feature generator executing on the computer processor configured to generate historical user features from the historical user events, and generate new user features from the new user events. The system further includes an event predictor including a decision tree and executing on the computer processor. The event predictor is configured to generate, using the historical user features, a training data set including feature vectors each labeled with an outcome of a historical requested event. Each feature vector includes a value for each of the historical user features. The event predictor is further configured to add, to the decision tree, by calculating, using the training data set, feature relevance metrics for the historical user features: internal nodes corresponding to a subset of the historical user features, branches corresponding to the values of the subset of the historical user features, and leaf nodes each corresponding to an outcome of the historical requested event. The event predictor is further configured to detect a request from the user to cause a new requested event, and make a prediction regarding an outcome of the new requested event by traversing, through the decision tree, a path including: a series of branches each corresponding to a value of one of the new user features, and a leaf node corresponding to the outcome. The system further includes a repository including the historical clickstream data, the new clickstream data, the historical user events, the new user events, the historical user features, the new user features, and the training data set.

In general, in one aspect, one or more embodiments of the invention relate to a non-transitory computer readable medium including instructions that, when executed by a processor, perform extracting, from historical clickstream data, historical user events, generating historical user features from the historical user events, and generating, using the historical user features, a training data set including feature vectors each labeled with an outcome of a historical requested event. Each feature vector includes a value for each of the historical user features. The instructions further perform adding, to a decision tree, by calculating, using the training data set, feature relevance metrics for the historical user features: internal nodes corresponding to a subset of the historical user features, branches corresponding to the values of the subset of the historical user features, and leaf nodes each corresponding to an outcome of the historical requested event. The instructions further perform extracting, for a user and from new clickstream data, new user events, generating new user features from the new user events, detecting a request from the user to cause a new requested event, and making a prediction regarding an outcome of the new requested event by traversing, through the decision tree, a path including: a series of branches each corresponding to a value of one of the new user features, and a leaf node corresponding to the outcome.

Other aspects of the invention will be apparent from the following description and the appended claims.

DETAILED DESCRIPTION

Figure 1A:
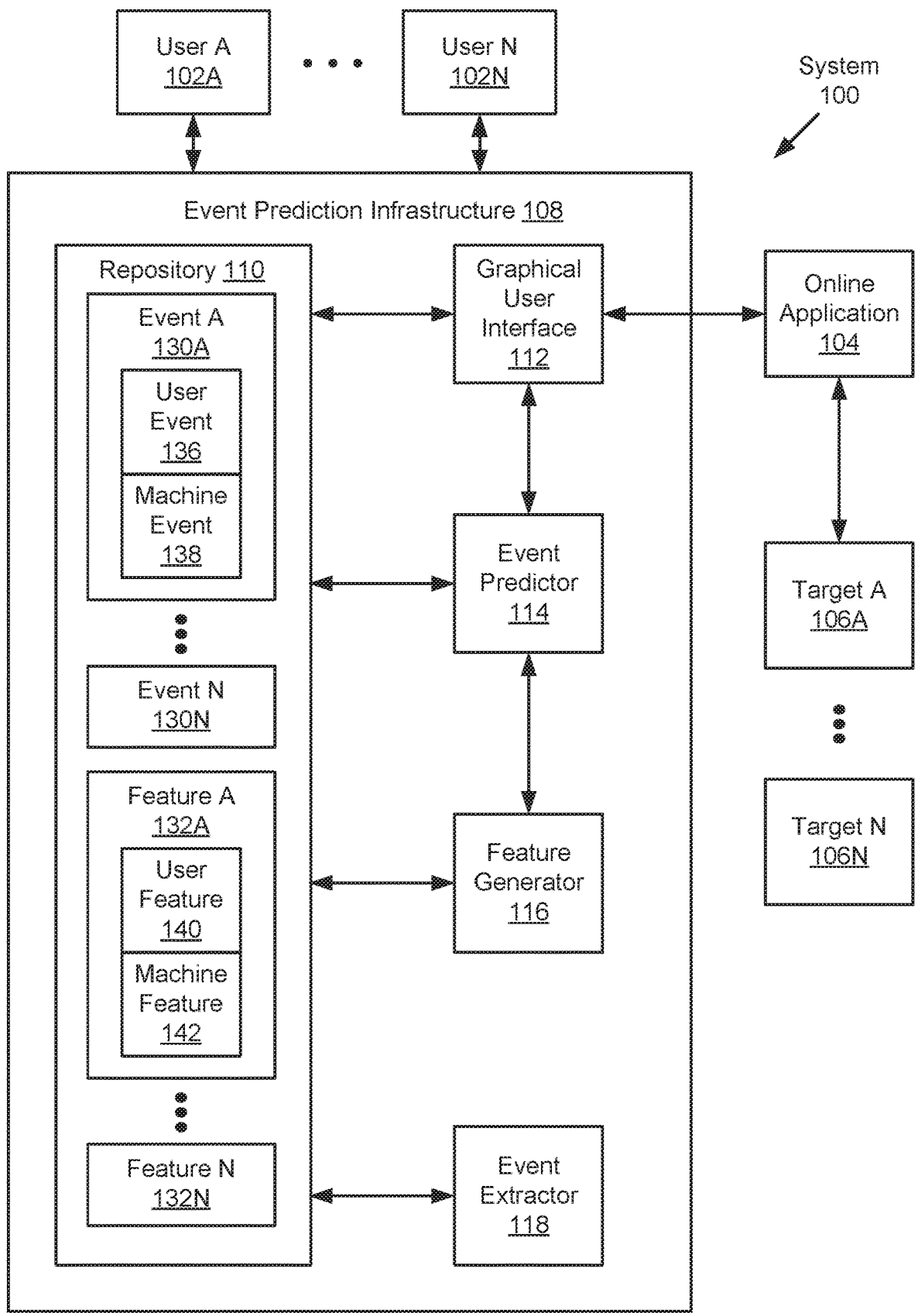
FIG. 1A and FIG. 1B show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to a system, method, and non-transitory computer readable medium for predicting the outcome of a requested event. The prediction may be based on the experiences of previous users requesting the causation of the requested event, for example, to advise a current user regarding possible courses of action. The prediction may be based on features generated from user events extracted from clickstream data. The requested event may be connecting to a target (e.g., a service provider, such as a bank) over a network using an online application. In one or more embodiments, the prediction is performed using a machine learning model trained using features generated from user events extracted from historical clickstream data. In one or more embodiments, the model is based on decision trees. The training data may also include machine events (e.g., extracted from machine or networking logs). The features may be based on an aggregation or summary of data associated with events.

FIG. 1A shows a system (100) in accordance with one or more embodiments of the invention. As shown in FIG. 1A, the system (100) includes users (102A, 102N), an online application (104), targets (106A, 106N), and an event prediction infrastructure (108). In one or more embodiments, the event prediction infrastructure (108) and/or each target (106A, 106N) take the form of the computing system (500) described with respect to FIG. 5A and the accompanying description below, or take the form of the client device (526) described with respect to FIG. 5B.

In one or more embodiments, a user (102N) may be an individual, business, or other entity that uses the online application (104). In one or more embodiments, the user (102N) may use the online application (104) to attempt to connect to one or more targets (106A, 106N). Each target (106A, 106N) may be a financial institution (e.g., a service provider, such as a bank or credit union), service provider, merchant, etc. with which the user (102N) desires to interact (e.g., to add an account, to fetch transactions, etc.). In one or more embodiments, the online application (104) is any software application used by multiple users (102A, 102N) over a network. For example, the online application (104) may be a personal financial management application, such as Mint® (Mint is a trademark of Intuit, Inc., Mountain View, Calif.), or a business management application, such as Intuit® QuickBooks Online® (Intuit and QuickBooks Online are trademarks of Intuit, Inc., Mountain View, Calif.).

In one or more embodiments, the event prediction infrastructure (108) includes a repository (110), a graphical user interface (GUI) (112), an event predictor (114), a feature generator (116), and an event extractor (118). In one or more embodiments, the repository (110) may be any type of storage unit and/or device (e.g., a file system, database, collection of tables, or any other storage mechanism) for storing data. Further, the repository (110) may include multiple different storage units and/or devices. The multiple different storage units and/or devices may or may not be of the same type or located at the same physical site.

In one or more embodiments, the repository (110) includes events (130A, 130N) and features (132A, 132N). In one or more embodiments, events (130A, 130N) are recognized by software (e.g., event handler software) and/or computing hardware. In one or more embodiments an event (130A) may be a user event (136). User events (136) may be extracted from clickstream data associated with the use of the online application (104) (e.g., obtained via the GUI (112)). In one or more embodiments, clickstream entries may include one or more of the following: a component of the GUI (112) (e.g., a menu selection, a button, etc.), a timestamp, a Uniform Resource Locator (URL) link, an entry in a machine log (e.g., a HyperText Transfer Protocol (HTTP) request corresponding to a URL link), etc. The clickstream data may be stored in the repository (110).

In one or more embodiments, a user event (136) is a mouse click, mouse hover, keystroke, or any other type of input provided or triggered by a user (102A) via the GUI (112). Another example of a user event (136) may be a request to cause an event (130A). For example, the requested event (130A) may be connecting to a target (1.06A) or adding a target (106A) to a list of targets. Still other examples of user events (136) may include: viewing a web page, a selection (e.g., from a menu), authentication, user error (e.g., username or password typed incorrectly), etc. In one or more embodiments, a specific type of user event (136) may correspond to a specific type of clickstream entry. For example, a "menu selection" user event (136) may correspond to a clickstream entry that includes a menu object and an object selected from the menu.

In one or more embodiments an event (130A) may be a machine event (138). In one or more embodiments, a machine event (138) is a message from an executing program or thread. Examples of machine events (138) may include errors, diagnostic data, performance data and/or status data (e.g., network connection attempt, network connection failure or success, network traffic messages, network usage messages, acknowledgments, thresholds crossed, etc.).

In one or more embodiments, features (132A, 132N) are attributes extracted from events (130A, 130N). In one or more embodiments, a feature (132A) represents an aggregation or summary of data associated with events (130A, 130N). For example, a feature (132A) may be a count of events (130A, 130N) of a specific type. As another example, a feature (132A) may be a count of events (130A, 130N) within a specific time interval (e.g., where the time interval ends with a request to cause a specific event (130A), or the where the time interval ends with the outcome of a specific event (130A)). Other examples of features (132A, 132N) may include: an average value of an attribute associated with events (130A, 130N) of a specific type, or a statistical measurement of an attribute associated with events (130A, 130N) of a specific type. Alternatively, a feature (132A) may represents any distinguishing characteristic associated with events (130A, 130N).

In one or more embodiments a feature (132A) may be a user feature (140) generated from user events (136). A user feature (140) may be any attribute related to a user event (136). For example, a user feature (140) may be a count of mouse clicks, mouse hovers, keystrokes, or any other input provided or triggered by a user (102A) via the GUI (112). Another example of a user feature (140) is a search term (e.g., when a user (102A) submits a query to find a target (106A)).

In one or more embodiments, a feature (132A) may be a machine feature (142) extracted from machine events (138). A machine feature (142) may be any attribute related to a machine event (138). For example, a machine feature (142) may be a count of messages (e.g., network connection messages) received from an executing program or thread. Another example of a machine feature (142) may be a connectivity rating of a target (106A). For example, the connectivity rating may be represented in terms of a connection speed, a percentage of attempted connections to the target (106A) that were successful, or some other attribute of an attempted connection to the target (106A).

Continuing with FIG. 1A, in one or more embodiments, the graphical user interface (GUI) (112) includes functionality to receive input from users (102A, 102N). The input may correspond to user events (136). The GUI (112) may include functionality to provide results, instructions, status messages, error messages, help messages, etc. to users (102A, 102N). In one or more embodiments, the GUI (II 12) includes a user interface component (e.g., widget) used to interface with the online application (104). The GUI (112) may include functionality to track and/or record events (130A, 130N) (e.g., user events (136) extracted from clickstream data).

In one or more embodiments, the event extractor (118) may be implemented in hardware (e.g., circuitry), software, firmware, and/or any combination thereof in one or more embodiments, the event extractor (118) includes functionality to extract events (130A, 130N) from data sources. For example, the event extractor (118) may extract user events (136) by querying a clickstream. Similarly, the event extractor (118) may extract machine events (138) by querying machine logs, networking logs, etc. The event extractor (118) may include functionality to store events (130A, 130N) in the repository (102).

In one or more embodiments, the feature generator (116) may be implemented in hardware (e.g., circuitry), software, firmware, and/or any combination thereof. In one or more embodiments, the feature generator (116) includes functionality to generate features (132A, 132N) from events (130A, 130N). In one or more embodiments, the feature generator (116) includes functionality to generate features (132A, 132N) based on querying a collection of events (130A, 130N) (e.g., stored in the repository (102)). The feature generator (116) may include functionality to store features (132A, 132N) in the repository (102).

Figure 1B:
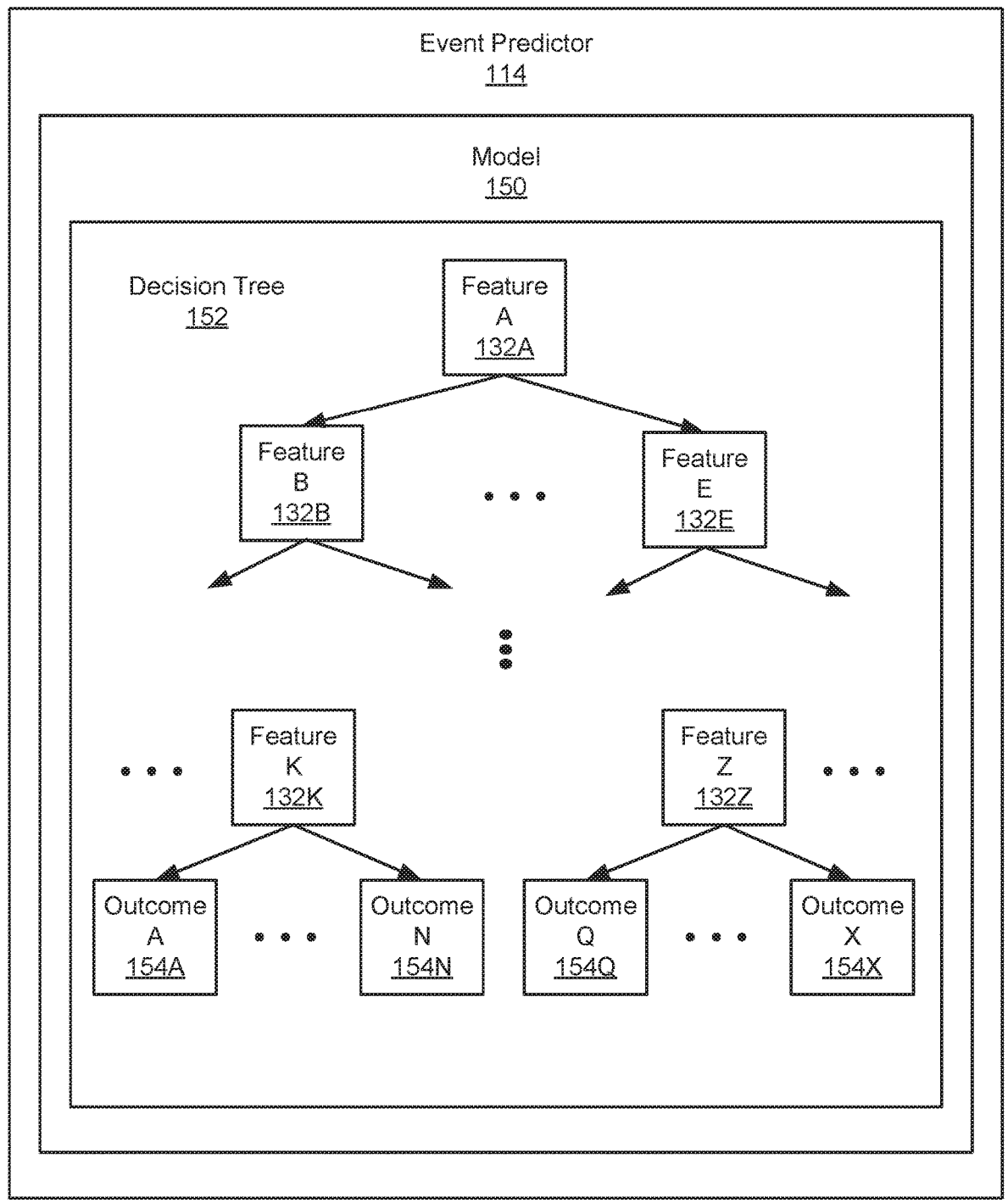

Continuing with FIG. 1A, in one or more embodiments, the event predictor (114) may be implemented in hardware (e.g., circuitry), software, firmware, and/or any combination thereof. Turning to FIG. 1B, in one or more embodiments, the event predictor (114) includes a model (150). In one or more embodiments, the event predictor (114) includes functionality to use machine learning techniques (e.g., using the MLlib machine learning library from Apache Spark™ or systems with similar functionality) to generate the model (150). For example, the model (150) may be based on random forests, support vector machines, naïve Bayes, etc. In one or more embodiments, the event predictor (114) may be implemented using Python libraries and toolkits, such as, for example, Numpy, SciPy, Pandas, and/or Scikit-learn.

In one or more embodiments, the model (150) is a decision tree (152) whose internal nodes correspond to features (e.g., feature A (132A), feature B (132B), feature E (132E), feature K (132K), and feature Z (132Z)). Each of the features may be a user feature (140) or a machine feature (142). In one or more embodiments, the event predictor (114) includes functionality to predict an outcome (e.g., outcome A (154A), outcome N (154N), outcome Q (154Q), and outcome X (154X)) of an event (130N) requested by a user (1.02N). The model (150) may learn the correlation of features (e.g., feature A (132A), feature B (132B), feature E (132E), feature K (132K), and feature Z (132Z)) to outcomes (e.g., outcome A (154A), outcome N (154N), outcome Q (154Q), and outcome X (154X)) based on a supervised training data set. In one or more embodiments, each element of the training data set is a vector of feature values labeled with an outcome. The branches (e.g., edges) of the decision tree (152) may represent values of the features (Rokach, Lior; Maimon, O. (2008). *Data mining with decision trees: theory and applications*. World Scientific Pub Co Inc. ISBN 978-9812771711).

In one or more embodiments, a leaf node of the decision tree (152) represents a possible outcome (e.g., outcome A (154A), outcome N (154N), outcome Q (154Q), and outcome X (154X)) of an event (130N) based on a path through the decision tree (152) to the leaf node. A leaf node of the decision tree (152) may also represent a probability associated with the outcome.

In one or more embodiments, a path through the decision tree (152) includes a series of branches terminating at a leaf node. The series of branches may correspond to the values of a feature vector, where the feature vector assigns a value to each of a set of features. Each path may classify the feature values corresponding to the branches on the path as a predicted outcome of an event (e.g., an outcome of an event at a leaf node) with a corresponding probability. In one or more embodiments, the probability associated with a leaf node is the ratio of the successful outcomes divided by the total number of outcomes in the training data set at the branch of the decision tree (152) terminating at the leaf node. For example, one leaf node may represent an outcome indicating the occurrence of an event (e.g., successful connection to a target (106A)) with a probability of 0.3. And another leaf node may represent an outcome indicating the non-occurrence of an event (e.g., failure to connect to a target (106A)) with a probability of 0.7. The model (150) may learn the probabilities associated with various outcomes based on supervised training data.

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
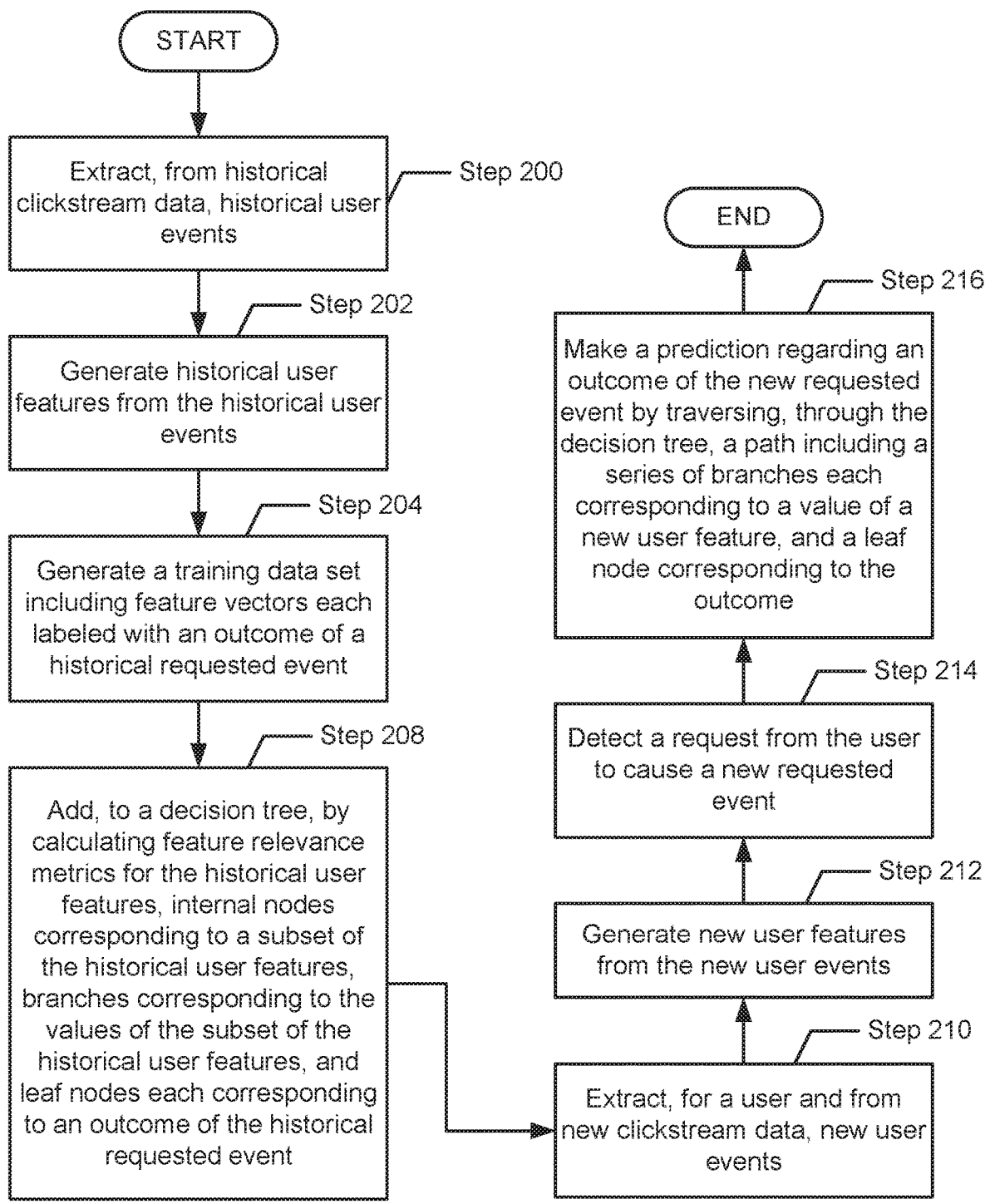
FIG. 2 and FIG. 3 show flowcharts in accordance with one or more embodiments of the invention.

FIG. 2 shows a flowchart in accordance with one or more embodiments of the invention. The flowchart depicts a process for predicting an event outcome. One or more of the steps in FIG. 2 may be performed by the components (e.g., the GUI (112), event predictor (114), feature generator (116), or event extractor (118) of the event prediction infrastructure (108)), discussed above in reference to FIG. 1A. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 200, historical user events are extracted from historical clickstream data. For example, a user event may be a mouse click, mouse hover, keystroke, a selection, authentication, user error, viewing a web page, or any other input provided or triggered by a user via the graphical user interface (GUI). In one or more embodiments, the event extractor may extract the user events by querying clickstream data stored in a repository and associated with the use of an online application by users. In one or more embodiments, the clickstream data may include a component of the GUI (e.g., a menu selection, a button, etc.), a timestamp, a URI, link (e.g., to an authentication website), etc. In one or more embodiments, a specific type of clickstream entry may correspond to a specific type of user event (e.g., a menu selection, initiating an authentication sequence, etc.). For example, a query may extract "menu selection" user events by selecting clickstream entries that include a menu object and an object selected from the menu. Similarly, queries may be constructed to extract different types of user events from the clickstream data, where the type of user event corresponds to a specific type of clickstream entry, having specific characteristics. In addition, clickstream queries may be constructed based on the GUI component clicked. Furthermore, clickstream queries may be constructed to extract clickstream data within a specific time interval.

In Step 202, historical user features are generated from the historical user events (see description of Step 202 above). In one or more embodiments, a feature represents an aggregation or summary of data associated with events. A feature may represent a vector of event-related data that is consumable by a predictive machine learning model (see description of Step 216 below). For example, a user feature may be a count of events of a specific type, such as mouse clicks, mouse hovers, keystrokes, search terms, or any other inputs provided or triggered by a user via the GUI. As another example, a feature may be a count of events within a specific time interval (e.g., where the time interval ends with a request to cause a specific event, or the where the time interval ends with the outcome of a specific event). In one or more embodiments, a user feature may be any attribute related to a user event. In one or more embodiments, the feature generator includes functionality to generate user features based on querying a collection of user events (e.g., stored in the repository).

In Step 204, a training data set is generated using the historical user features. The training data set may include feature vectors each labeled with an Outcome of a historical requested event. Each feature vector may include a value for each of the historical user features.

In Step 208, internal nodes, branches, and leaf nodes are added to a decision tree by calculating, using the training data set, feature relevance metrics for the historical user features. The internal nodes may correspond to a subset of the historical user features. The branches may correspond to the values of the subset of the historical user features. Each leaf node may correspond to an outcome of the historical requested event. The leaf node may also represent a probability associated with the outcome.

In one or more embodiments, the decision tree is generated by adding a series of internal nodes each corresponding to a feature. Branches may be added to the decision tree corresponding to the values of the feature present in the training data set. Each internal node may "split" the training data set into subsets based on the values of the corresponding feature, where each branch may correspond to one or more feature values. For example, in FIG. 4A, there are 2 branches connected to the "number of authentication events" feature (402): one branch corresponding to a value of 1, and another branch corresponding to a value of 2 or more. Each branch may then be connected to another internal node, or to a leaf node.

In one or more embodiments, at each splitting (e.g., branching) point in the decision tree, an internal node is added corresponding to the feature that is most relevant to the outcome of the requested event based on the training data set (Quinlan, J. R., (1986). Induction of Decision Trees. Machine Learning 1: 81-106, Kluwer Academic Publishers). Feature relevance may be determined by a feature relevance metric based on the information gain of the feature relative to the outcomes of the requested events in the training data set.

The information gain of the feature may be calculated based on the difference between an information content measure at a current node of the decision tree (e.g., before adding a new internal node corresponding to the feature) and the averaged information content measures corresponding to the child nodes connected to the current node. In one or more embodiments, the information content measure may be based on the information theory concept of entropy, where greater entropy corresponds to greater information content. Alternatively, the feature relevance metric may be based on a gain ratio (e.g., which also may be based on entropy).

The information gain may be used to determine which feature in a set of feature vectors in training data is most useful for discriminating between outcomes. The information gain of a feature may be calculated as the difference between the entropy of the current node and the weighted sum of the entropies of the child nodes of the current node. The entropy at a node may be calculated according to the following formula:

$$\text{Entropy} = \Sigma_i - p_i * \log_2 p_i$$

where $p_i$ is the probability of outcome i (e.g., where outcome i is either success or failure), calculated as the proportion of feature vectors labeled with the corresponding outcome in the training data subset at the node.

Figure 4A:
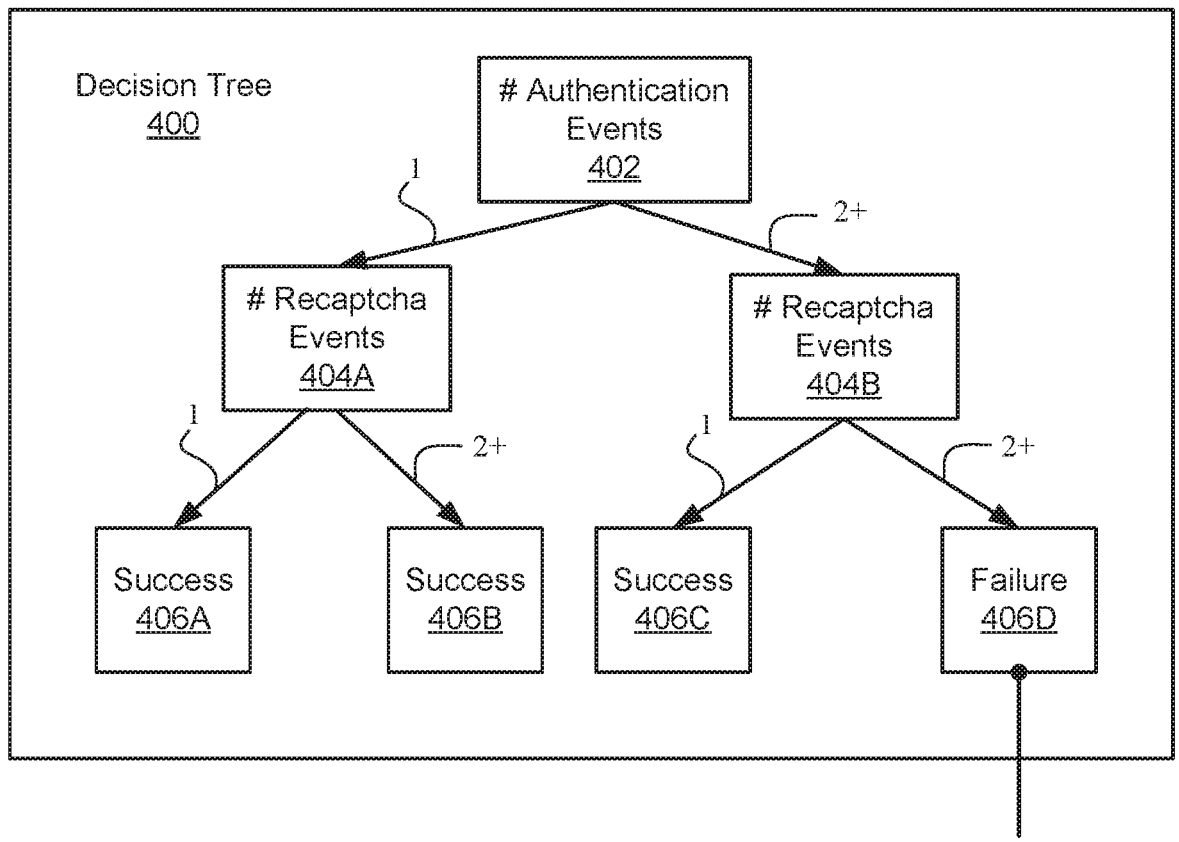
FIG. 4A, FIG. 4B, and FIG. 4C show examples in accordance with one or more embodiments of the invention.
Figure 4A:
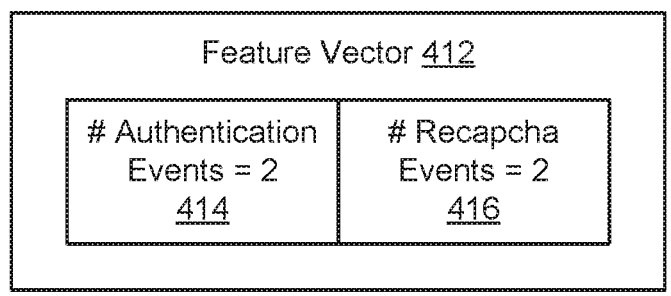

For example, in FIG. 4A, there are 2 features, corresponding to the number of authentication events and the number of recaptcha events. In this example, there are 14 data points, each corresponding to a feature vector that assigns a value to both the number of authentication events and the number of recaptcha events. Each data point is also labeled with an outcome. To decide which feature to split on, the information gain of each of 2 trees is compared, where each tree is based on branching on one of the 2 features.

In FIG. 4A, a leaf node (406A, 406B, 406C, 406D) is labeled as failure when the probability of a failure outcome associated with the leaf node is above 0.5 (e.g., the training data subset at the leaf node includes more failure outcomes than success outcomes). Similarly, a leaf node is labeled as success when the probability of a success outcome associated with the leaf node is above 0.5 (e.g., the training data set at the leaf node includes more success outcomes than failure outcomes).

The information gain associated with the number of authentication events feature may be calculated as follows. The split using the number of authentication events feature results in 2 child nodes (404A, 404B), one for the number of authentication events equal to 1, and another for the number of authentication events 2 or more. In the training data set, there are 6 data points with the number of authentication events equal to 1, 3 of which have an outcome of success and 3 with an outcome of failure. The 8 remaining data points with the number of authentication events 2 or more include 2 failure outcomes and 6 success outcomes. The information content of "the number of authentication events equal to 1" child node (404A) may be calculated using the entropy equation above. Since there are an equal number of successes and failures at node (404A), the information content $I([3, 3]) = -3/6 \log_2 3/6 - 3/6 \log_2 3/6 = -1/2 \log_2 1/2 - 1/2 \log_2 1/2 = 1$. For the child node (404B) where the number of authentication events is 2 or more, there are 8 data points, corresponding to 2 failure outcomes and 6 success outcomes. The corresponding information content $I([6, 2]) = -6/8 \log_2 6/8 - 2/8 \log_2 2/8 = -3/4 \log_2 3/4 - 1/4 \log_2 1/4 = 0.81$. The information content corresponding to the split on the number of authentication events feature may be based on the weighted average of the above 2 numbers, based on how many data points were in each node (404A, 404B), as follows: Information content $I([3, 3], [6, 2]) = 6/14 \ast 1 + 8/14 \ast 0.81 = 0.89$. Then, to calculate the information gain of the split using the number of authentication events feature, we first calculate the information content in the training data set prior to the split to the child nodes (404A, 404B). The original training data set (e.g., at node (402)) included 9 success outcomes and 5 failure outcomes, so the original information content $I([9, 5]) = -9/14 \log_2 9/14 - 5/14 \log_2 5/14 = 0.94$. Therefore, the information gain (IG) achieved by splitting on the number of authentication events feature is: $IG = I([9, 5]) - I([3, 3], [6, 2]) = 0.94 - 0.89 = 0.05$. Similar calculations may be performed to determine the information gain for the number of recaptcha events feature.

For example, the first (e.g., root) internal node added to the decision tree may correspond to a first feature with the highest feature relevance metric (e.g., information gain), which in this example, is the number of authentication events feature. The second internal node added to the decision tree may correspond to a second feature with the highest feature relevance metric, after removing the first feature from consideration, and so on. Internal nodes may be added to the decision tree until a termination criterion is satisfied. In one or more embodiments, the termination criterion may be that none of the remaining features has a feature relevance metric exceeding a threshold value. Alternatively, the termination criterion may be that none of the remaining features has an associated information gain (e.g., when none of the remaining features affect the outcome of the requested event).

When the termination criterion is satisfied, leaf nodes may be connected to the most recently added branches. A probability may be assigned to the leaf node based on the proportion of event outcomes in the subset of the training data set at the leaf node.

In one or more embodiments, a random forest approach may be used where multiple decision trees are generated using random sets of features selecting from the training data set (Breiman, L. (1996). Bagging Predictors. "Machine Learning, 24": pp. 123-140). For example, at each branch (e.g., split) point, a random subset of features may be used. Then, the resulting predictions obtained from the multiple decision trees may be combined (e.g., using a voting algorithm). In one or more embodiments, other approaches to generating bootstrap aggregated (e.g., bagged) decision trees may be used. Using a random forest approach may reduce variance without increasing the bias by generating de-correlated trees based on different training data sets (e.g., to avoid overfitting to a training data set).

In Step 210, new user events are extracted for a user from clickstream data (see description of Step 200 above).

In Step 212, new user features are generated from the new user events (see description of Step 202 above).

In Step 214, a request from the user to cause a new requested event is detected. For example, the new requested event may be an attempt to connect to a target (e.g., a service provider) over a network, where the outcome may be "occurred" (e.g., successful connection to the target) or "did not occur" (e.g., failure to connect to the target). In one or more embodiments, the request from the user to cause the new requested event is a user event (e.g., extracted from the clickstream data in Step 200 above).

In Step 216, a prediction is made regarding the outcome of the new requested event by traversing a path through the decision tree. The path may include a series of branches that represent values of the new user features (e.g., corresponding to a feature vector) generated above in Step 212, and a leaf node representing the outcome of the new requested event. The predicted outcome is the outcome indicated at the leaf node in the path.

Figure 3:
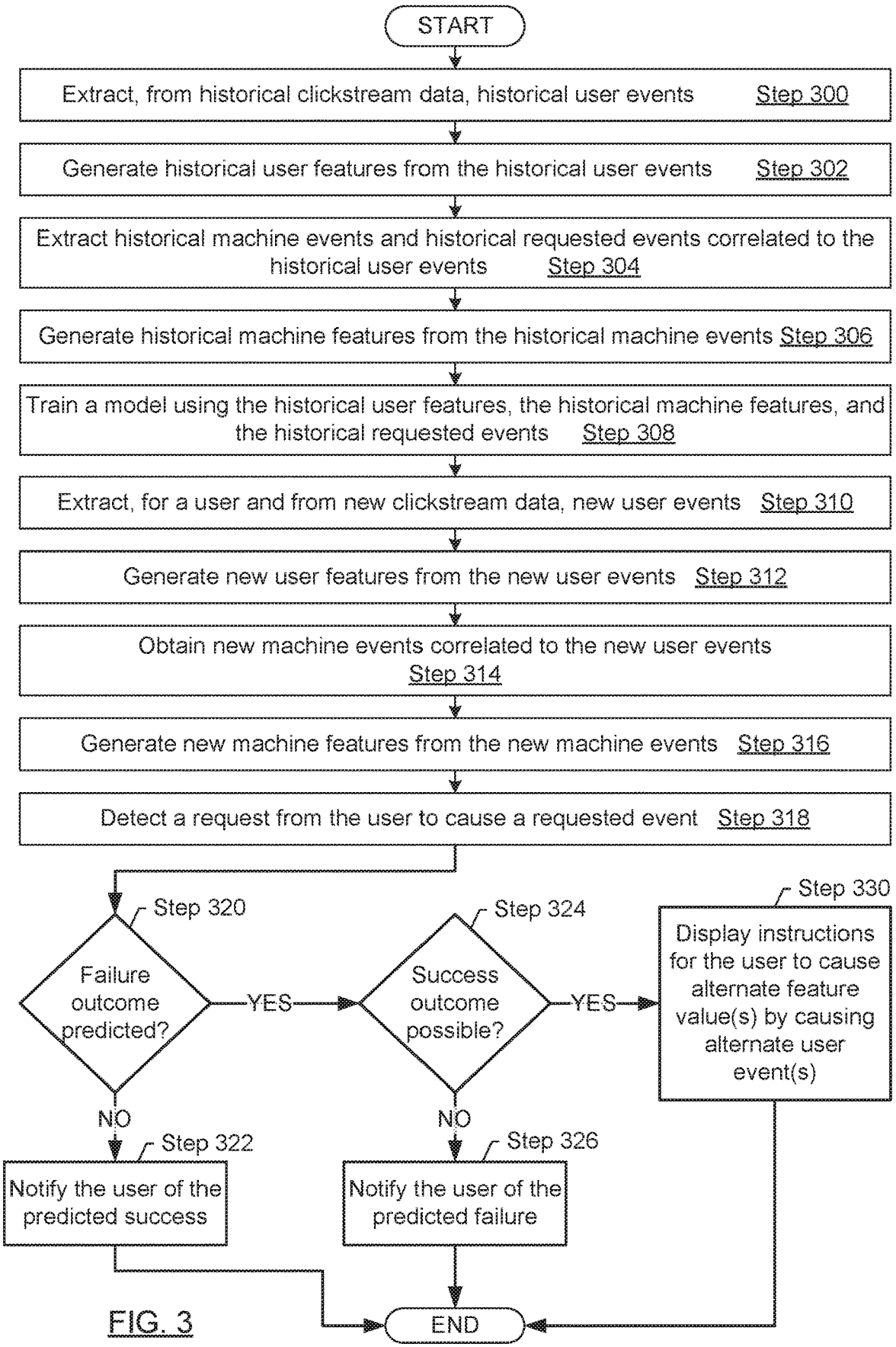

FIG. 3 shows a flowchart in accordance with one or more embodiments of the invention. The flowchart depicts a process for predicting an event outcome. One or more of the steps in FIG. 3 may be performed by the components (e.g., the GUI (112), event predictor (114), feature generator (116), or event extractor (118) of the event prediction infrastructure (1108)), discussed above in reference to FIG. 1A. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 300, historical (e.g., previous) user events are extracted from historical clickstream data (see description of Step 200 above).

In Step 302, historical user features are generated from the historical user events (see description of Step 202 above).

In Step 304, historical machine events and historical requested events correlated to the historical user events (see description of Step 200 above) are extracted. In one or more embodiments, a machine event is a message from an executing program or thread. Examples of machine events may include errors, diagnostic data, etc. relating to the performance and/or status of a machine or network.

In one or more embodiments, the event extractor may extract the historical machine events by querying machine logs, networking logs, etc. stored in a repository. In one or more embodiments, the historical machine events may be correlated to the historical user events by identifying information in the historical machine events that is associated with the historical user events. For example, the correlated historical machine events may include a session identifier related to the use of an online application (e.g., associated with a specific user). Alternatively, the correlated historical machine events may include a timestamp within an interval during which a user session with the online application was active. Still alternatively, the correlated historical machine events may include a timestamp within an interval that begins with the timestamp of a user event that requested the causation of a historical requested event and ends with the timestamp of the outcome of the historical requested event.

In one or more embodiments, each historical requested event may be any event that was previously requested to be caused by a user. For example, the historical requested event may have been an attempt to connect to a target over a network, where the outcome may be "occurred" (e.g., successful connection to the target) or "did not occur" (e.g., failure to connect to the target). In one or more embodiments, the event extractor may extract the historical requested events from various logs and/or other data stored in a repository. In one or more embodiments, the historical requested events may be correlated to the historical user events by identifying information in the historical requested events that is associated with the historical user events. For example, the correlated historical requested events may include an identifier associated with a session identifier related to the use of an online application (e.g., associated with a specific user).

In Step 306, historical machine features are generated from the historical machine events (see description of Step 302 above). A machine feature may be any attribute related to a machine event. For example, a machine feature may be a count of messages (e.g., network connection messages) received from an executing program or thread. Another example of a machine feature may be a connectivity rating of a target. In one or more embodiments, the feature generator includes functionality to generate historical machine features based on querying a collection of historical machine events (e.g., stored in the repository).

In Step 308, a decision tree is trained using the historical user features, the historical machine features, and the historical requested events (see description of Step 208 above). In one or more embodiments, the features used to train the decision tree may be user features (e.g., historical user features) or machine features (e.g., historical machine features).

In Step 310, new user events, for a user, are extracted from new clickstream data (see description of Step 210 above). In one or more embodiments, the event extractor may extract the new user events by querying clickstream data obtained via the graphical user interface (GUI). For example, the new user events may be related to a current user session with the online application (e.g., in contrast to the historical user events).

In Step 312, new user features are generated from the new user events see description of Step 212 above).

In Step 314, new machine events correlated to the new user events are obtained. In one or more embodiments, the new machine events may be correlated to the new user events by identifying information in the new machine events that is associated with the new user events (see description of Step 304 above).

In Step 316, new machine features are generated from the new machine events (see description of Step 306 above). In one or more embodiments, the feature generator includes functionality to generate the new machine features based on querying the new machine events.

In Step 318, a request from the user to cause a requested event is detected (see description of Step 204 above).

If, in Step 320, the predicted outcome (see description of Step 216 above) of the requested event is "failure", then Step 324 below is performed. In one or more embodiments, the predicted outcome is based on an initial path whose branches include feature values for a subset of the new user features generated in Step 312 above and a subset of the new machine features generated in Step 316 above.

Otherwise, if Step 320 determines that the predicted outcome of the requested event is "success", then in Step 322, the user is notified of the predicted successful outcome of the requested event.

If, in Step 324, a successful outcome of the requested event is possible, then Step 330 below is performed. The event predictor may predict the successful outcome when the decision tree includes an alternate path ending on an alternate leaf node corresponding to the successful outcome of the requested event. The alternate path may include one or more alternate branches that were not included in the initial path, where the alternate branch may correspond to an alternate value of a feature (e.g., a user feature or a machine feature). The alternate value of the feature may correspond to an alternate user event. For example, both the requested event and the alternate user event may be parts of a larger workflow. For example, the workflow may include a choice among different options, where each option corresponds to an event, such as using (e.g., connecting to) different service providers. Continuing this example, the user may be directed to an interface to the workflow to select an alternate option corresponding to the alternate user event. In one or more embodiments, it may be possible for the user to proactively initiate an event (e.g., alternate user event) to alter the outcome of the requested event, by altering the path through the decision tree.

Otherwise, if Step 324 determines that a successful outcome of the requested event is not possible, then in Step 326, the user is notified (e.g., via the GUI) of the predicted failure outcome of the requested event. The notification may include a help string advising the user how to proceed. For example, the help string may advise the user to cancel the request (i.e., the request detected above in Step 318) and then re-submit the request to cause the requested event. The notification may also include the initial path (e.g., the feature values of the branches of the initial path). In one or more embodiments, the event predictor may cancel the request due to the predicted failure outcome of the requested event.

In Step 330, instructions are displayed (via the GUI) for the user to cause one or more alternate user events that cause one or more features to take on an alternate feature value. For example, the alternate user event may introduce an additional layer of protection or security into a transaction. In another example, the alternate user event may reset a parameter elated to the requested event, or may cause the value of a feature to be reset.

Experiments using a prototype implementation of the techniques embodied in FIG. 2 and FIG. 3 demonstrated an overall accuracy of 93% on a data set that included over 2,000 requested events (i.e., requests to connect to a bank over a network).

Figure 4B:
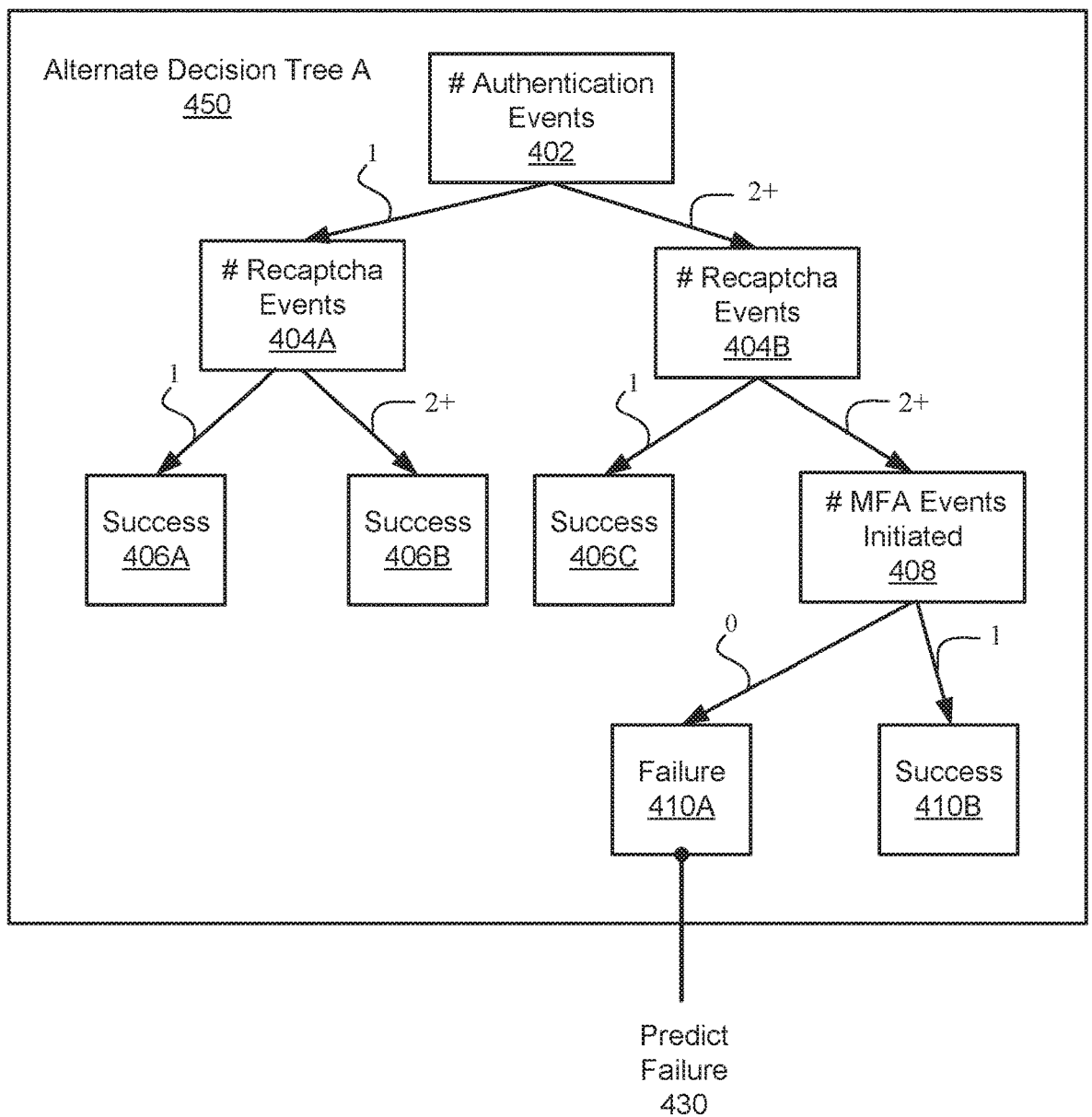
Figure 4B:
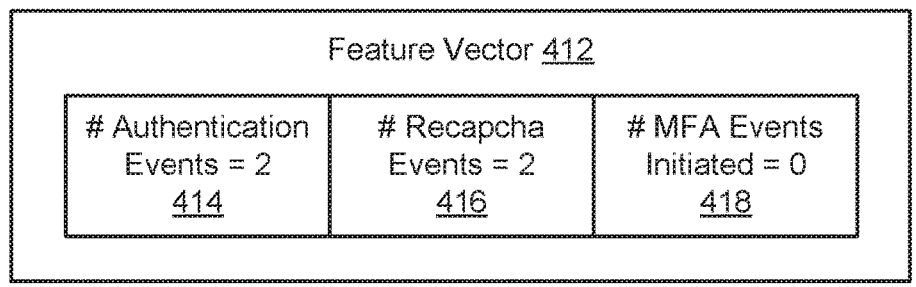
Figure 4C:
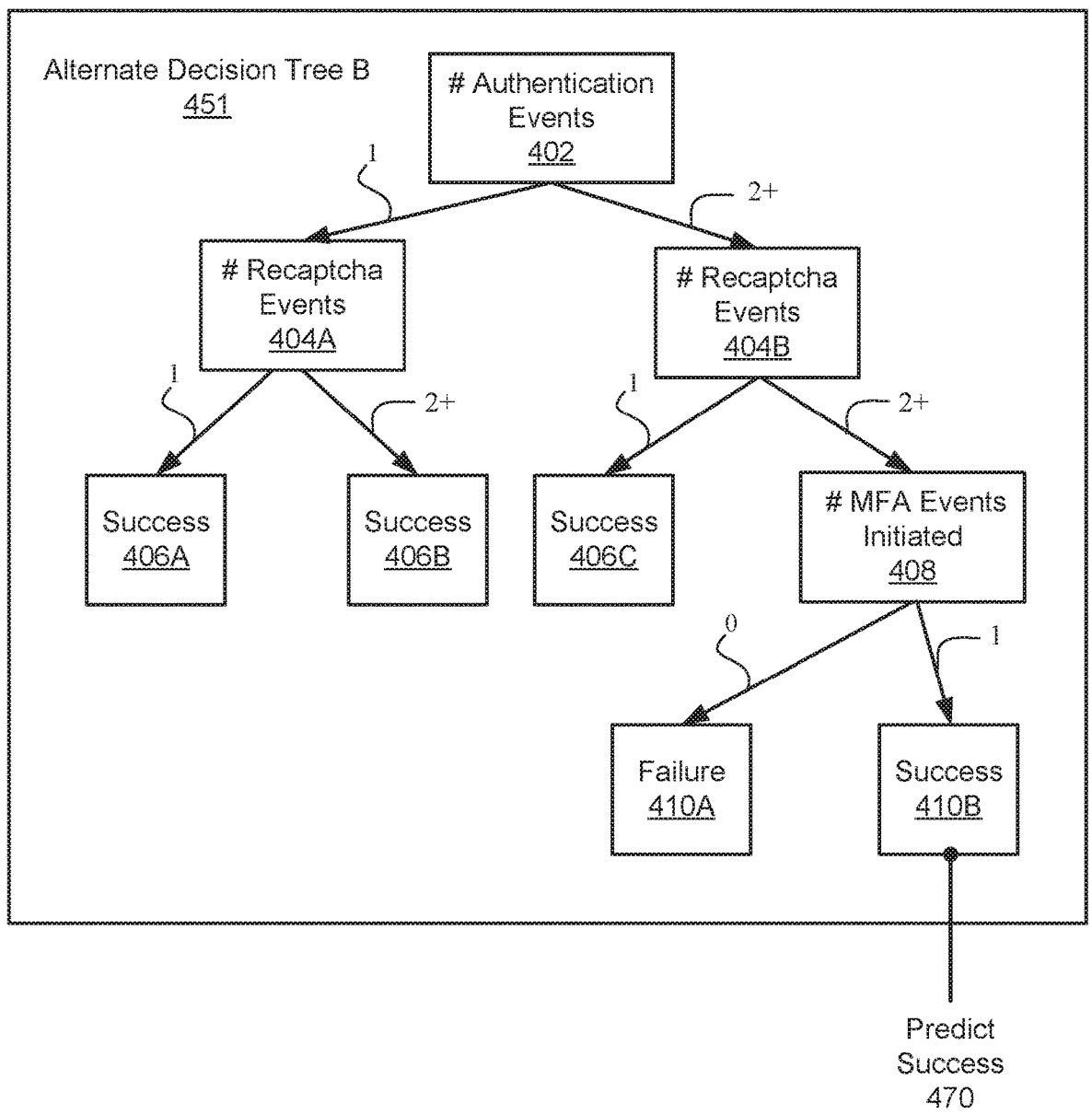
Figure 4C:
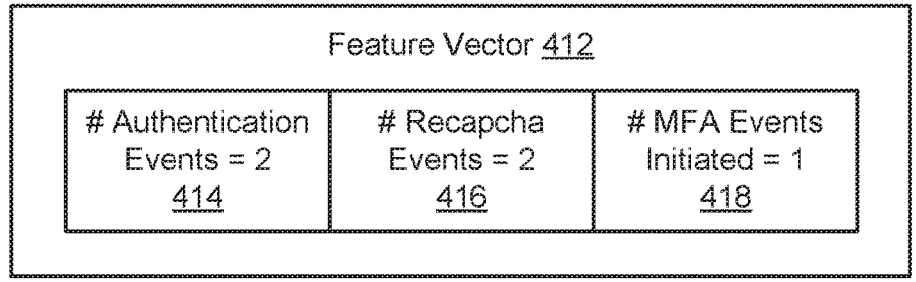

The following example is for explanatory purposes only and not intended to limit the scope of the invention. FIG. 4A, FIG. 4B, and FIG. 4C show an implementation example in accordance with one or more embodiments of the invention.

Initially, the event extractor (118) extracts historical user events from historical clickstream data associated with the use of the online application (104). The event extractor (118) also extracts, from machine and/or networking logs, historical machine events and historical requested events correlated to the historical user events based on identifying session identifiers related to the use of the online application (104). The historical events include authorization events, recaptcha (e.g., challenge-response) events, selection events, error events, and initiation of multi-factor authentication. Next, the feature generator (116) generates features from the historical user events and the historical machine events. The features include the number of authorization events, the number of recaptcha events, the number of selection events, the number of error events, and the number of initiated multi-factor authentications. Then, the event predictor (114) generates a decision tree using supervised training data including the features and historical requested events. In this example, the requested event is connecting to a service provider (e.g., using the online application (104)). The training data indicates whether or not the requested connections were successful.

FIG. 4A illustrates the decision tree (400) which includes an internal root node corresponding to a "number of authentication events" feature (402), and internal nodes corresponding to a "number of recaptcha events" feature (404A, 404B). Each branch of the decision tree (400) corresponds to a value of the feature (402, 404A, 404B) corresponding to the internal node above the branch point. The decision tree (400) also includes leaf nodes corresponding to the success or failure outcome (406A, 406B, 406C, 406D) of the requested event.

As described previously, the internal nodes of the decision tree (400) are ordered by the relevance of their corresponding features, based on the training data set. That is, the "number of authentication events" feature (402) is the most relevant feature, followed by the "number of recaptcha events" feature (404A, 404B). As described previously, feature relevance is determined by a feature relevance metric based on the information gain of the feature relative to the outcome of the requested events in the training data set. As described below, the decision tree (400), once generated, may be used to predict the outcome of the requested event, where the prediction is based on traversing a path through the decision tree using a feature vector generated from actual events.

Next, the event extractor (18) extracts new user events from new clickstream data associated with the use of the online application (104). The event extractor (118) also extracts new machine events correlated to the new user events. In this example, the new events include 2 authentication events and 2 recaptcha events.

Next, the feature generator (116) generates a feature vector (412) from the new events, as illustrated in FIG. 4A. The feature vector (412) includes the "number of authentication events" feature value (414) and the "number of recaptcha events" feature value (416). Next, the event predictor (114) makes a prediction based on traversing a path through the decision tree (400) using the feature vector (412). The path begins at the root node, which corresponds to the "number of authentication events" feature (402), and follows the right-hand branch because the "number of authentication events" feature value (414) is 2. Then, the path again follows the right-hand branch at the internal node corresponding to the "number of recaptcha events" feature (404B), because the "number of recaptcha events" feature value (416) is 2. The path then terminates on a leaf node corresponding to a "failure" outcome (406D). A notification is then displayed, via the graphical user interface (GUI) (112), to the user (102A) regarding the failure prediction (430). The notification includes a list of the features corresponding to the path, to provide additional information regarding the prediction that may be useful to the user (102A) in future requests.

An alternate scenario, based on an alternate decision tree A (450) is illustrated in FIG. 4B. The alternate decision tree A (450) includes an additional internal node corresponding to a "number of multi-factor authentication events initiated" feature (408), followed by additional leaf nodes (410A, 414B) corresponding to the success or failure outcome. For example, in this hypothetical alternate scenario, the connection to the service provider may be more likely to succeed when the service provider is reassured by the presence of robust multi-factor authentication. In FIG. 4B, the feature vector (412) includes an additional "number of multi-factor authentication events initiated" feature value (418). In this alternate scenario, the event predictor (114) makes a prediction based on traversing an alternate path through the alternate decision tree A (450) using the feature vector (412). As in FIG. 4A, the alternate path follows the right-hand branch at the internal node corresponding to the "number of recaptcha events" feature (404B). However, the alternate path then follows the left-hand branch at the internal node corresponding to the "number of multi-factor authentication events initiated" feature (408) because the "number of multi-factor authentication events initiated" feature value (418) is zero. The alternate path then terminates on a leaf node corresponding to a "failure" outcome (410A). A notification is then displayed, via the GUI (112), to the user (102A) regarding the failure prediction (430). However, in this alternate scenario, the notification includes a suggestion that the user (102A) may initiate a multi-factor authentication event to cause a change to the "number of multi-factor authentication events initiated" feature value (418). The motivation for the suggestion is to change the termination point of the alternate path to a leaf node corresponding to a "success" outcome (410B).

FIG. 4C illustrates Alternate Decision Tree B (451) depicting the result after the user follows the suggestion and initiates the multi-factor authentication event. In FIG. 4C, the alternate path follows the right-hand branch at the internal node corresponding to the "number of multi-factor authentication events initiated" feature (408) because the "number of multi-factor authentication events initiated" feature value (418) is now set to 1 within feature vector (412). Therefore, the alternate path now terminates on a leaf node corresponding to a "success" outcome (410B). A notification is then displayed, via the GUT (112), to the user (102A) regarding the success prediction (470).

Figure 5A:
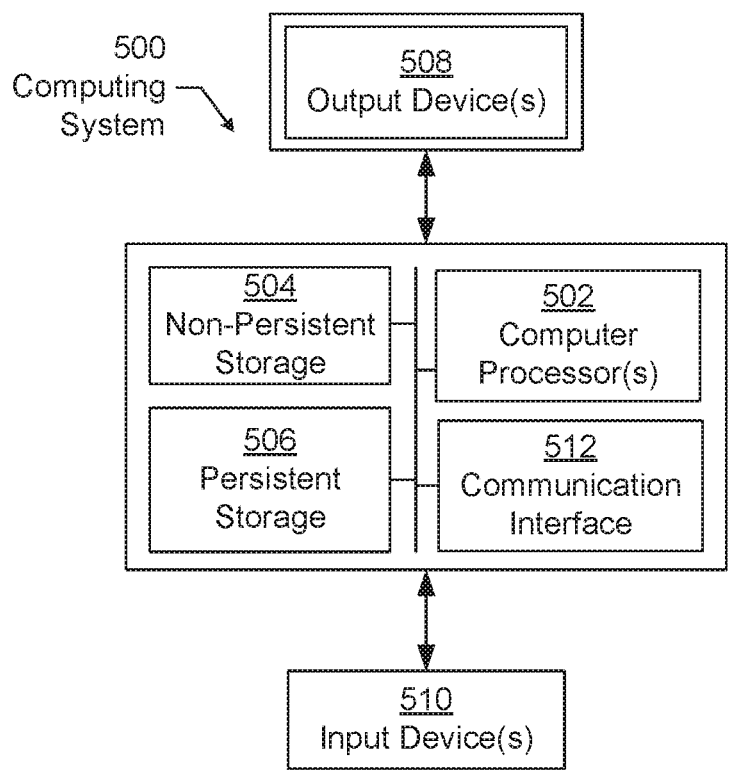
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
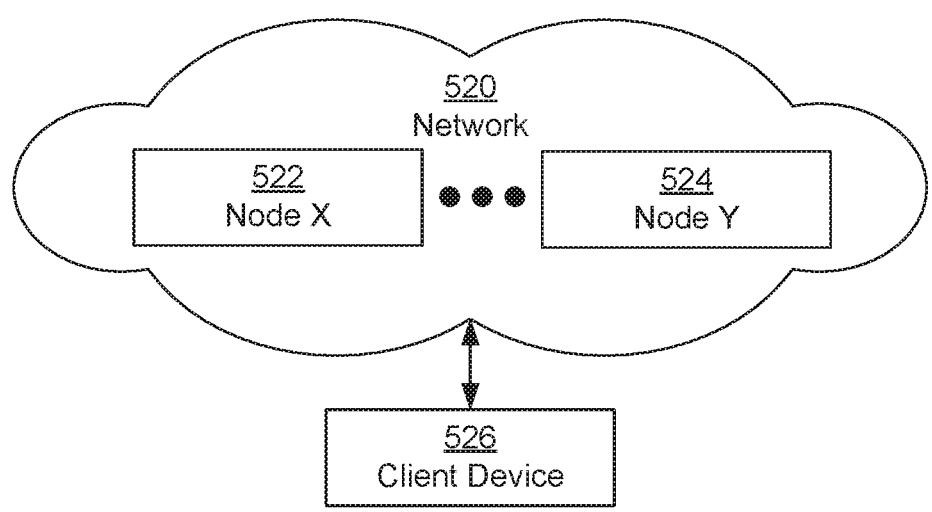

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   extracting, from historical clickstream data, a plurality of historical user events;
   generating a plurality of historical user features from the plurality of historical user events;
   generating, using the historical user features, a training data set comprising feature vectors each labeled with an outcome of a historical requested event, each feature vector comprising a value for each of the plurality of historical user features;
   adding, to a decision tree, by calculating, using the training data set, a plurality of feature relevance metrics for the plurality of historical user features:
      internal nodes corresponding to a subset of the plurality of historical user features,
      branches corresponding to the values of the subset of the plurality of historical user features, and
      leaf nodes each corresponding to an outcome of the historical requested event;
   extracting, for a user and from new clickstream data, a plurality of new user events;
   generating a plurality of new user features from the plurality of new user events;
   detecting a request from the user to cause a new requested event; and
   making an initial prediction regarding an initial outcome of the new requested event by traversing, through the decision tree, an initial path comprising: a first series of branches each corresponding to a value of one of the plurality of new user features, and an initial leaf node corresponding to the initial outcome.

2. The method of claim 1, wherein the initial outcome corresponds to the failure of the new requested event to occur, the method further comprising:
   displaying, to the user and via a graphical user interface (GUI), an initial notification comprising an initial help string comprising the initial prediction and the initial path; and
   canceling the request.

3. The method of claim 1, wherein the initial outcome corresponds to the failure of the new requested event to occur, the method further comprising:
   determining that the decision tree comprises an alternate path comprising an alternate series of branches and an alternate leaf node corresponding to an alternate outcome, wherein the alternate series of branches comprises an alternate branch corresponding to an alternate feature value not included in the initial path, wherein the alternate outcome corresponds to the successful occurrence of the new requested event;
   determining that the alternate feature value corresponds to an alternate user event;
   making an alternate prediction regarding the alternate outcome by traversing the alternate path; and
   displaying, to the user and via a GUI, an alternate notification comprising an alternate help string comprising the alternate prediction, the alternate path, and instructions to cause the alternate user event.

4. The method of claim 1, further comprising:
   extracting a plurality of new machine events correlated to the plurality of new user events;
   generating a plurality of new machine features from the plurality of new machine events;
   extracting a plurality of historical machine events correlated to the plurality of historical user events; and
   generating a plurality of historical machine features from the plurality of historical machine events,
   wherein the training data set is further generated using the plurality of historical machine features, and
   wherein the initial path further comprises a second series of branches each corresponding to one of the plurality of new machine features.

5. The method of claim 1,
   wherein the historical user feature corresponding to the respective internal node corresponds to a highest feature relevance metric of the plurality of feature relevance metrics,
   wherein the internal nodes are added to the decision tree until the satisfaction of a termination condition indicating that the highest feature relevance metric is below a threshold value, and
   wherein the method further comprises removing the historical user feature corresponding to the respective internal node from the subset of the plurality of historical user features after adding the respective internal node to the decision tree.

6. The method of claim 1, wherein the feature vector is labeled with the outcome of the historical requested event by correlating the historical requested event with the plurality of historical user events.

7. The method of claim 1, wherein the new requested event is connecting to a target over a network, and wherein the request corresponds to one of the new user events.

8. A system, comprising:
   a computer processor;
   an event extractor executing on the computer processor configured to:
      extract, from historical clickstream data, a plurality of historical user events; and
      extract, for a user and from new clickstream data, a plurality of new user events;
   a feature generator executing on the computer processor configured to:
      generate a plurality of historical user features from the plurality of historical user events; and generate a plurality of new user features from the plurality of new user events;

an event predictor comprising a decision tree and executing on the computer processor, wherein the event predictor is configured to:
   generate, using the historical user features, a training data set comprising feature vectors each labeled with an outcome of a historical requested event, each feature vector comprising a value for each of the plurality of historical user features;
   add, to the decision tree, by calculating, using the training data set, a plurality of feature relevance metrics for the plurality of historical user features:
      internal nodes corresponding to a subset of the plurality of historical user features,
      branches corresponding to the values of the subset of the plurality of historical user features, and
      leaf nodes each corresponding to an outcome of the historical requested event;
   detect a request from the user to cause a new requested event; and
   make an initial prediction regarding an initial outcome of the new requested event by traversing, through the decision tree, an initial path comprising: a first series of branches each corresponding to a value of one of the plurality of new user features, and an initial leaf node corresponding to the initial outcome; and
a repository comprising the historical clickstream data, the new clickstream data, the plurality of historical user events, the plurality of new user events, the plurality of historical user features, the plurality of new user features, and the training data set.

9. The system of claim 8, further comprising a graphical user interface (GUI),
   wherein the initial outcome corresponds to the failure of the new requested event to occur,
   wherein the event predictor is further configured to cancel the request, and
   wherein the GUI is configured to:
      display, to the user, an initial notification comprising an initial help string comprising the initial prediction and the initial path.

10. The system of claim 8, further comprising a graphical user interface (GUI),
   wherein the initial outcome corresponds to the failure of the new requested event to occur,
   wherein the event predictor is further configured to:
      determine that the decision tree comprises an alternate path comprising an alternate series of branches and an alternate leaf node corresponding to an alternate outcome, wherein the alternate series of branches comprises an alternate branch corresponding to an alternate feature value not included in the initial path, wherein the alternate outcome corresponds to the successful occurrence of the new requested event;
      determine that the alternate feature value corresponds to an alternate user event; and
      make an alternate prediction regarding the alternate outcome by traversing the alternate path, and
   wherein the GUI is configured to:
      display, to the user, an alternate notification comprising an alternate help string comprising the alternate prediction, the alternate path, and instructions to cause the alternate user event.

11. The system of claim 8,
   wherein the event extractor is further configured to:
      extract a plurality of new machine events correlated to the plurality of new user events; and
      extract a plurality of historical machine events correlated to the plurality of historical user events,
   wherein the feature generator is further configured to:
      generate a plurality of new machine features from the plurality of new machine events, wherein the initial path further comprises a second series of branches each corresponding to one of the plurality of new machine features; and
      generate a plurality of historical machine features from the plurality of historical machine events, wherein the training data set is further generated using the plurality of historical machine features.

12. The system of claim 8,
   wherein the historical user feature corresponding to the respective internal node corresponds to a highest feature relevance metric of the plurality of feature relevance metrics,
   wherein the internal nodes are added to the decision tree until the satisfaction of a termination condition indicating that the highest feature relevance metric is below a threshold value, and
   wherein the method further comprises removing the historical user feature corresponding to the respective internal node from the subset of the plurality of historical user features after adding the respective internal node to the decision tree.

13. The system of claim 8, wherein the feature vector is labeled with the outcome of the historical requested event by correlating the historical requested event with the plurality of historical user events.

14. The system of claim 8, wherein the new requested event is connecting to a target over a network, and wherein the request corresponds to one of the new user events.

15. A non-transitory computer readable medium comprising instructions that, when executed by a processor, perform:
   extracting, from historical clickstream data, a plurality of historical user events;
   generating a plurality of historical user features from the plurality of historical user events;
   generating, using the historical user features, a training data set comprising feature vectors each labeled with an outcome of a historical requested event, each feature vector comprising a value for each of the plurality of historical user features;
   adding, to a decision tree, by calculating, using the training data set, a plurality of feature relevance metrics for the plurality of historical user features:
      internal nodes corresponding to a subset of the plurality of historical user features,
      branches corresponding to the values of the subset of the plurality of historical user features, and
      leaf nodes each corresponding to an outcome of the historical requested event;
   extracting, for a user and from new clickstream data, a plurality of new user events;
   generating a plurality of new user features from the plurality of new user events;
   detecting a request from the user to cause a new requested event; and
   making an initial prediction regarding an initial outcome of the new requested event by traversing, through the decision tree, an initial path comprising: a first series of branches each corresponding to a value of one of the plurality of new user features, and an initial leaf node corresponding to the initial outcome.

16. The non-transitory computer readable medium of claim 15, wherein the initial outcome corresponds to the failure of the new requested event to occur, further comprising instructions that perform:
  displaying, to the user and via a graphical user interface (GUI), an initial notification comprising an initial help string comprising the initial prediction and the initial path; and
  canceling the request.

17. The non-transitory computer readable medium of claim 15, wherein the initial outcome corresponds to the failure of the new requested event to occur, further comprising instructions that perform:
  determining that the decision tree comprises an alternate path comprising an alternate series of branches and an alternate leaf node corresponding to an alternate outcome, wherein the alternate series of branches comprises an alternate branch corresponding to an alternate feature value not included in the initial path, wherein the alternate outcome corresponds to the successful occurrence of the new requested event;
  determining that the alternate feature value corresponds to an alternate user event;
  making an alternate prediction regarding the alternate outcome by traversing the alternate path; and
  displaying, to the user and via a GUI, an alternate notification comprising an alternate help string comprising the alternate prediction, the alternate path, and instructions to cause the alternate user event.

18. The non-transitory computer readable medium of claim 15, further comprising instructions that perform:
  extracting a plurality of new machine events correlated to the plurality of new user events;
  generating a plurality of new machine features from the plurality of new machine events;
  extracting a plurality of historical machine events correlated to the plurality of historical user events; and
  generating a plurality of historical machine features from the plurality of historical machine events,
  wherein the training data set is further generated using the plurality of historical machine features, and
  wherein the initial path further comprises a second series of branches each corresponding to one of the plurality of new machine features.

19. The non-transitory computer readable medium of claim 15,
  wherein the historical user feature corresponding to the respective internal node corresponds to a highest feature relevance metric of the plurality of feature relevance metrics,
  wherein the internal nodes are added to the decision tree until the satisfaction of a termination condition indicating that the highest feature relevance metric is below a threshold value, and
  wherein the instructions further perform removing the historical user feature corresponding to the respective internal node from the subset of the plurality of historical user features after adding the respective internal node to the decision tree.

20. The non-transitory computer readable medium of claim 15, wherein the feature vector is labeled with the outcome of the historical requested event by correlating the historical requested event with the plurality of historical user events.

* * * * *